United States Patent
Schröder (10) Patent No.: US 6,527,427 B1
(45) Date of Patent: Mar. 4, 2003

(54) CLUTCHING FEATURE FOR ADJUSTING DEVICE

(75) Inventor: Joachim Schröder, Bad Berleburg (DE)

(73) Assignee: Asyst Technologies, LLC, Kenosha, WI (US)

( * ) Notice: Subject to any disclaimer, the term of this patent is extended or adjusted under 35 U.S.C. 154(b) by 0 days.

(21) Appl. No.: 09/687,770

(22) Filed: Oct. 14, 2000

(51) Int. Cl.[7] ............................................... F21V 19/02
(52) U.S. Cl. ...................... 362/524; 362/523; 74/89.13; 464/30
(58) Field of Search ................................. 362/524, 463, 362/514, 460, 462, 515, 423, 428, 422, 528; 74/89.13; 464/30, 37, 38; 192/56.61

(56) References Cited

U.S. PATENT DOCUMENTS

| | | | |
|---|---|---|---|
| 4,210,033 A | 7/1980 | Erikson et al. | |
| 4,578,740 A | 3/1986 | Krizmanic | |
| 4,737,891 A | 4/1988 | Burton | |
| 4,881,152 A | 11/1989 | Watanabe et al. | |
| 4,893,219 A | * 1/1990 | Lisak .......................... | 362/524 |
| 5,214,971 A | 6/1993 | Burton et al. | |
| 5,309,780 A | 5/1994 | Schmitt | |
| 5,453,914 A | 9/1995 | Dobler | |
| 5,486,985 A | 1/1996 | Kemper et al. | |
| 5,526,238 A | 6/1996 | Van Oel et al. | |
| 5,539,625 A | * 7/1996 | Turley, Jr. et al. .......... | 362/524 |
| 5,546,283 A | 8/1996 | Ohtsuka et al. | |
| 5,707,133 A | 1/1998 | Burton | |
| 5,746,559 A | 5/1998 | Shirai | |
| 5,913,601 A | * 6/1999 | Daumuller et al. ......... | 362/463 |
| 6,017,136 A | 1/2000 | Burton | |
| 6,036,341 A | 3/2000 | Dobler et al. | |
| 6,042,254 A | 3/2000 | Burton | |
| 6,050,712 A | 4/2000 | Burton | |

FOREIGN PATENT DOCUMENTS

| | | |
|---|---|---|
| DE | 3929878 | 9/1989 |
| DE | 4041676 | 12/1990 |
| DE | 4216274 | 5/1992 |
| DE | 19619586 | 5/1996 |
| DE | 19920689 | * 12/2000 |

* cited by examiner

Primary Examiner—Sandra O'Shea
Assistant Examiner—Bao Truong
(74) Attorney, Agent, or Firm—Brian G. Gilpin; Godfrey & Kahn, S.C.

(57) ABSTRACT

A device for setting the distance between a first and a second component, in particular for the horizontal and vertical setting of motor vehicle headlamps, includes a setting screw which is connected to the first component, and which engages the second component. The drive for the setting screw has a slipping clutch that prevents overadjustment of the distance setting device after a maximum torque is reached. The slipping clutch prevents the transmission of torque to the setting screw by slipping, and thereby prevents damage to the distance setting device.

32 Claims, 5 Drawing Sheets

CLUTCHING FEATURE FOR ADJUSTING DEVICE

FIELD OF THE INVENTION

The present invention relates to adjusting devices and, in particular, to a clutching headlamp adjuster used to change the horizontal and vertical aim of motor vehicle headlamps.

BACKGROUND OF THE INVENTION

The aim of a headlamp in a motor vehicle must be set to meet certain specifications, first in a factory setting, and thereafter at specific time intervals by means of adjustment. Special adjustment devices exist which provide adjustment of the horizontal and vertical setting of a headlamp with respect to the headlamp housing. With such devices, the reflector of the headlamp is usually connected to the headlamp housing at three points; one point is fixed, and the other two points consist of the horizontal and vertical adjustment devices. An example of one such device, which is generally referred to as a "right-angle" adjuster is disclosed in U.S. Pat. No. 5,707,133 to Burton.

Another type of adjuster is disclosed in U.S. Pat. No. 6,036,341 to Dobler et al. These adjustment devices generally consist of a threaded setting screw connected to the headlamp housing along the axis of rotation. This setting screw is fixed axially, but allowed to rotate. Further, the setting screw has a crown wheel with bevel-wheel toothing for engaging a drive, and is attached to a guide part which can move along the axis of the setting screw when the setting screw rotates. This guide part is also connected to the reflector via connecting elements, e.g., a socket. Thus, when the setting screw is rotated by means of the drive, the reflector moves in the corresponding direction of adjustment. At the same time, depending on the direction of rotation, the orientation of the reflector within the headlamp housing changes.

The setting screw is driven by a bevel gear that engages the bevel-wheel toothing on the crown wheel. The bevel gear is attached to the headlamp housing so that it can rotate, and is driven with the aid of a drive means, such as a screwdriver, which engages into a corresponding recess of the bevel wheel. The bevel gear transmits the torque to the crown wheel, with the result that the setting screw rotates about its longitudinal axis to move the guide part.

This adjustment system works well when the bevel wheel is not driven past the systems end position. However, going beyond the end position can result in damage to the adjustment device, the reflector, or the headlamp housing. Specifically, when built-in fixed stops are used, the device moves up against a stop so that when the driving bevel wheel is rotated further, damage to the weakest point of the device may occur. For example, the drive may slip, the setting screw may fracture, or the adjusting thread may slip. If there is no fixed stop provided in the device, the setting screw may become unscrewed from the counterthread of the guide part. As a result, the reflector and guide part fall out of the headlamp housing.

Alternatively, some adjusting devices use a spring instead of a fixed stop. If a setting screw loosens from the device, the spring presses the thread of the setting screw back into the counterthread of the guide part. However, one disadvantage of this spring setting device is that the setting screw and the guide part may reach an end position in which only a very short portion of thread remains with which to withstand all the torque. In this case, the threads may be stripped off.

In all the above mentioned adjustment devices, failure can occur so that the headlamp is useless. Unfortunately, a motor vehicle headlamp is only available as a part of an entire headlamp assembly. Therefore, replacement of the headlamp unit is significant expense for the car owner.

Thus, there is a need for an adjustment device that cannot be over adjusted. The present invention will be better understood from the following detailed description of the invention, read in connection with the drawings as hereinafter described.

SUMMARY OF THE INVENTION

The present invention provides a mechanism for a device used to set the distance between a first component and a second component, such as that used in a headlamp assembly, that will not break due to over adjustment. The mechanism is lightweight, non-corrosive, robust, and reliable and overcomes the disadvantages of the prior art.

As described in more detail below and shown in the accompanying drawings, the adjustment device includes a mechanism that prevents continued adjustment in the same direction once a maximum torque has been applied thereto, so that the adjustment device will not break upon application of additional torque. This is accomplished with a slipping clutch that fails to transmit torque to the adjustment device once the maximum torque has been applied. One or more of the following embodiments may be best suited for use in a particular application ranging from automobile headlamp adjusters to clocks and toys.

In one embodiment of the present invention, the slipping clutch is used as part of a mechanism to adjust the distance between a first component and a second component. In general, the slipping clutch includes a first clutch part adapted for engagement with a crown wheel. The crown wheel can be part of the second component, or on an intermediate component between the second component and the slipping clutch. The slipping clutch is generally constructed from a first clutch part and a second clutch part. The second clutch part is connected to the first clutch part so that it can rotate with respect thereto after a maximum torque has been applied to the slipping clutch. The "slipping" or rotation after the maximum torque has been reached prevents any additional adjustment between the first and second components, and thereby prevents breakage of the adjustment device.

The slipping clutch is substantially cylindrical, and further includes a bevel wheel at one end of the first clutch part, and a connecting head or a cavity at its opposite end. The second clutch part is connected to the first clutch part so that it cannot move axially with respect thereto, and the second clutch part can only move rotationally with respect to the first clutch part once the maximum torque has been applied to the slipping clutch. Therefore, the second clutch part includes a complementary cavity or connecting head for attachment with the cavity or connecting head of the first clutch part.

A plate is coupled between the first clutch part and the second clutch part, and has at least one boss protruding therefrom, or alternatively, and indent therein. The boss(es) or indent(s) on the plate are aligned with complementary boss(es) or indent(s) located on the first or second clutch part. When the first and second clutch part are attached together, the boss(es) fit into their corresponding indent(s) and stay there until the maximum torque causes the boss(es) to become unseated with respect to the indent(s) to and allow the first clutch part to be rotatable with respect to the second clutch part.

In another embodiment of the present invention, the slipping clutch is in combination with a device for setting the distance between a first component and a second component. Such devices generally include a setting screw adapted for connection to the first component, and a guide part connected to the setting screw and adapted for connection to the second component. The slipping clutch engages the setting screw in a manner that causes the guide part to move axially with respect to the setting screw until a maximum torque is applied to the slipping clutch.

Another embodiment is a method for producing a plastic slipping clutch having a first clutch part and a second clutch part. The method includes forming the first clutch part from a first plastic in a first mold, and forming the second clutch part from a second plastic in a second mold, wherein the shape of the first clutch part is at least part of the second mold.

The present invention can be used with any number of headlamp adjusters, such as those disclosed in U.S. Pat. Nos. 5,707,133; 5,214,971; and 6,050,712, to Burton the disclosures of which are incorporated herein by reference, and U.S. Pat. No. 6,036,341 to Dobler. As such, the term "adjuster" and variations thereof used herein should be interpreted as being inclusive of any of the wide variety of adjustment devices possible, including, without limitation, a wide variety of headlamp adjusters.

In sum, the present invention represents a significant improvement over the prior art in many ways. These and other objects and advantages of the present invention will become apparent from the detailed description and accompanying drawings.

DETAILED DESCRIPTION

Figure 1:
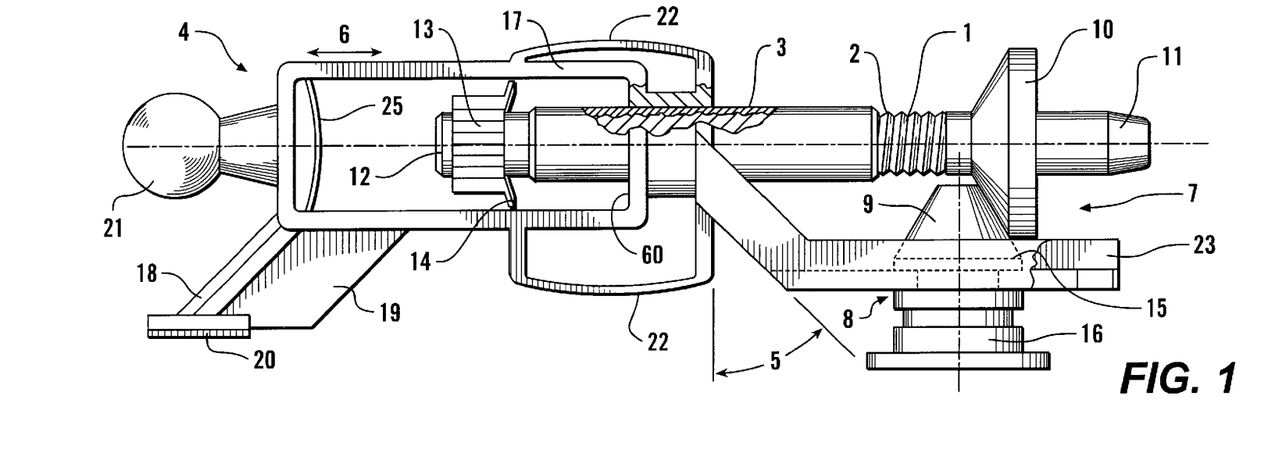
FIG. 1 is a side elevational view of one embodiment of a device according to the invention for setting the distance between a first and a second component.

One embodiment of a device according to the present invention, for setting the distance between a first and a second component, is illustrated in FIG. 1. The first component (not shown) may, for example, be a housing for a motor vehicle headlamp. The second component (not shown) may, for example, be a reflector for a motor vehicle headlamp. The present embodiment of the device according to the invention may thus serve for adjusting the aim of motor vehicle headlamps or any other components needing adjustment with respect to distance.

As shown in FIG. 1, a setting screw 1 is connected to the first component so that it can rotate. Setting screw 1 is preferably plastic, and in the form of a shaft with an external thread 2 extending at least partially over the length of setting screw 1. At one setting end of screw 1 is a crown wheel 10. Setting screw 1 and crown wheel 10 may be molded into a unitary structure. Thus, crown wheel 10 is preferably fixed to the setting screw 1 so that it neither rotates nor is axially displaceable with respect to setting screw 1.

A plastic guide part 4 is connectable to the second component. Preferably, guide part 4 is formed as a unitary plastic piece. The guide part 4 has a basic body 17 which includes structure having a counterthread 3. Counterthread 3 engages thread 2 of setting screw 1. Preferably, this counterthread 3 structure is an elongated tubular portion having internal threads.

Plastic guide part 4 also has a guide foot 18 produced in one piece with the basic body 17. Guide foot 18 extends away from body 17, laterally downwards in the direction of the second component, and has a rib 19 for reinforcement. Located at the end of guide foot 18 is a sliding part 20 which can be brought into sliding engagement with a corresponding guide rail of the first component.

The guide part 4 is mounted fixedly in terms of rotation to the headlamp housing so that it does not co-rotate during rotation of setting screw 4. However, the mounting of the guide part 4 to the headlamp housing is designed in such a way that the guide part 4 is displaceable in the axial direction. This is indicated by the double arrow 6.

Setting screw 1 has a first end 11 extending beyond crown wheel 10 which is of cylindrical design, and which is capable of being introduced into a corresponding mount of the first component. Setting screw 1 has an opposite second end 12, on which a fixed plastic stop 13 is arranged. The latter takes the form of a sleeve which is slipped over the second end 12 of the setting screw 1. As seen in FIG. 1, the fixed stop 13 has at an end portion near counterthread 3, and a collar 14 extends radially outwards and which is produced in one piece with the fixed stop 13.

Located on the side of the basic body 17 facing away from setting screw 1 is a ball 21 that is connectable to the second component. The second component has a corresponding ball socket for receiving ball 21. Ball 21 may be produced from plastic and in one piece with the basic body 17 of guide part 4. The first and second components in the previous two paragraphs can be interchanged and alternative materials and configurations may be used.

Guide part 4 has two leaf springs 22 attached to the basic body 17, one extending upwards and one downwards. It has been found effective to produce the leaf springs from plastic and in one piece with the basic body 17. The leaf springs 22 serve for fixing the guide part 4 vertically in a corresponding guide of the first component. Specifically, the spring-like element ensures that, even without a pull being exerted, the thread of the setting screw can be brought into engagement with the counterthread of the guide part again.

Referring still to FIG. 1, the guide part 4 has two arms 23 and 24 that extend in the direction of the drive section 7 and serve for the further axially displaceable mounting of the guide part 4 in the first component (arm 24 is concealed by arm 23). Arms 23, 24 are produced from plastic and in one piece with the basic body 17. Arms 23 and 24 may have a sloped portion that extend downwards from body 17 of guide part 4 at an angle 5 of about 45°. After the initial sloped portions, the arms run parallel to the longitudinal axis of setting screw 1. Guide part 4 also has a stop 25, for example, in the form of a spring on an inside surface opposite counterthread 3.

This embodiment of the device according to the invention includes a drive section 7. In the present embodiment, drive section 7 has a two-part plastic slipping clutch 8, as described herein. Torque can be transmitted to crown wheel 10 on setting screw 1 via a bevel wheel 9 on slipping clutch 8. For this purpose, a handwheel or an engagement device for a machine may be formed at that end of the slipping clutch 8 which faces away from the bevel wheel 9. It has been found effective to proportion the components such that one revolution of bevel wheel 9 leads to an adjustment of setting screw 1 by about 0.3 to 1 mm.

Figure 3:
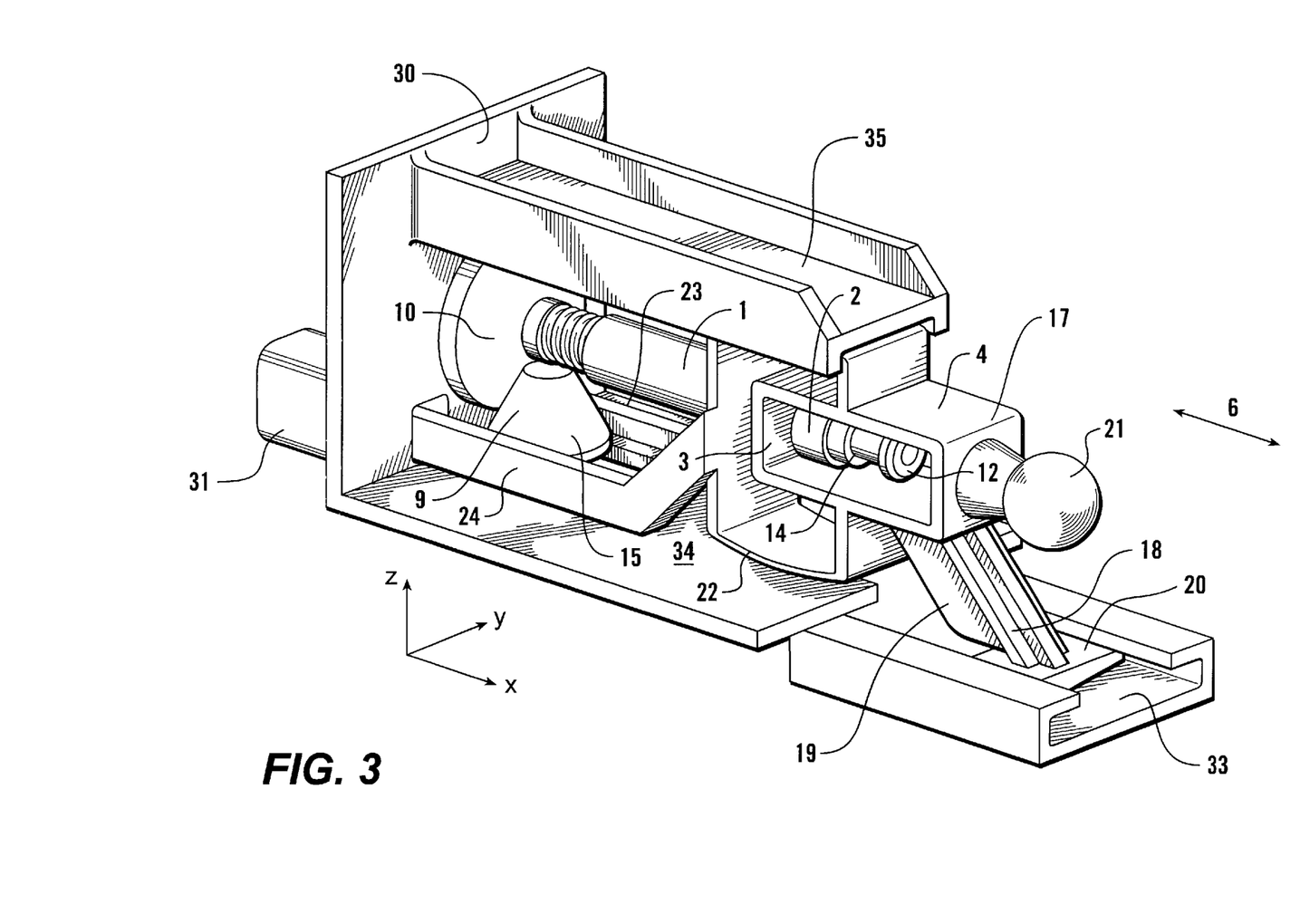
FIG. 3 is a rear perspective view of an embodiment of a device for the horizontal and vertical setting of motor vehicle headlamps.

FIG. 3 illustrates an additional embodiment of a device for the horizontal and vertical setting of motor vehicle headlamps. This device has the same functional features and components as the device illustrated in FIG. 1. Reference is made, to that extent, to the explanation regarding FIG. 1. The identical reference symbols in FIGS. 3 and 1 designate the same parts having the same functions.

The embodiment of the device shown in FIG. 3 further includes a housing 30, which is designed as part of a housing of a motor vehicle headlamp. Setting screw 1 is mounted rotatably at its first end 11 (seen in FIG. 1) in housing 30. Housing 30 preferably consists of plastic, is produced in one piece, and has two mountings 31, 32 (32 not shown) for receiving the arms 23, 24 of the guide part 4. The arms 23, 24 are mounted in mountings 31, 32 so that they can be displaced in the axial direction with respect to setting screw 1. Furthermore, housing 30 has a guide rail 33 to accommodate sliding part 20 of guide part 4. Sliding part 20 is mounted in guide rail 33 so as to also be displaceable in the axial direction. Guide part 4 is mounted by means of springs 22 so as to be axially displaceable between a housing bottom surface 34 and a double-T-shaped housing roof 35. The housing roof 35 also serves for fixing guide part 4 in a direction that is vertical with respect to surface 34.

The ball 21 of the guide part 4 is connectable to a second component, in the present case, the reflector of the motor vehicle headlamp. For this purpose, the second component preferably has a complementary ball socket. Such a configuration is disclosed in U.S. Pat. No. 6,036,341, the disclosure of which is incorporated herein by reference.

The slipping clutch 8 of drive section 7 is mounted rotatably in housing 30. The mounting is such that the slipping clutch 8 cannot execute any movement in the x-, y- or z-direction with respect to the housing 30. The slipping clutch 8, together with the bevel wheel 9, fixes the setting screw 1 in the housing 30 in the axial direction or x-direction via the crown wheel 10 of setting screw 1. Alternatively, the slipping clutch may be designed as part of the setting screw.

Figure 4:
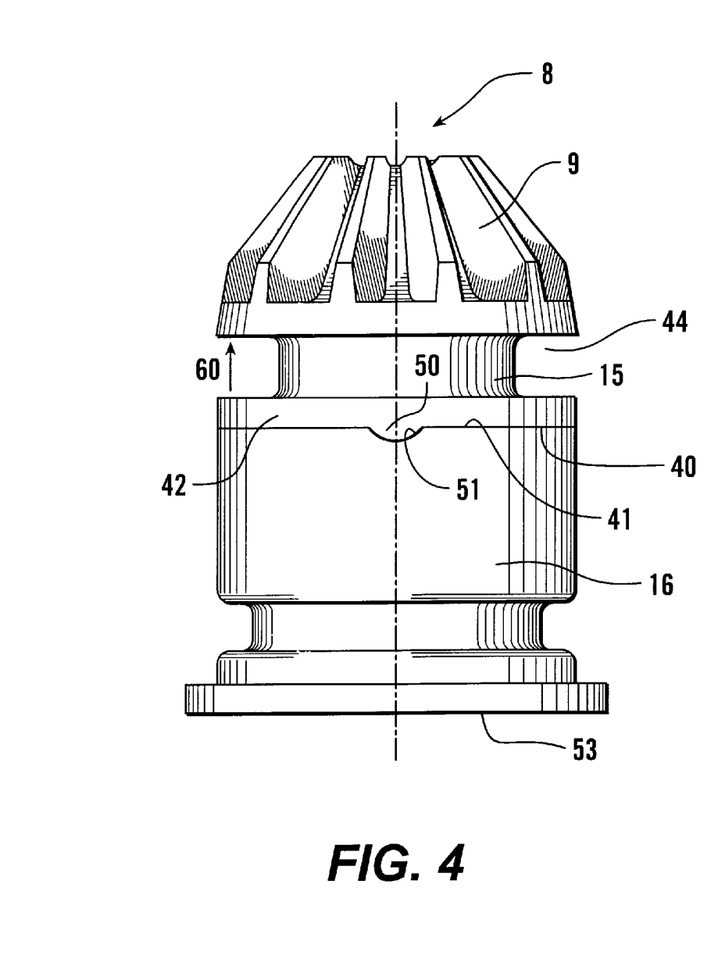
FIG. 4 is an elevational view of an embodiment of a slipping clutch.

By a screwdriver or the like, torque is transmitted to the second clutch part 16 of drive section 7 to first clutch part 15, see FIG. 4. According to the present invention, torque transmission takes place only as long as the effective torque does not exceed a maximum torque, as described herein.

The torque is transmitted from bevel wheel 9 via crown wheel 10 to the setting screw 1, which consequently rotates. Due to the rotation of setting screw 1, guide part 4 moves linearly in the direction of the arrow 6, away from or towards housing 30, depending on the direction of rotation. When guide part 4 is connected to the second component via ball 21, the distance between the first component, the housing 30 of a motor vehicle headlamp, and the second component, for example the reflector of the motor vehicle headlamp (not shown), can be set in this way. By a plurality of the devices according to the invention being arranged between the motor vehicle headlamp housing and the reflector, the motor vehicle headlamp can be set horizontally and/or vertically, and its aim or lighting range regulated.

When the minimum or maximum distance between the housing 30 and the reflector is reached, the slipping clutch slips so that further transmission of torque to the setting screw 1 is no longer possible. In this way, the device is protected from damage.

Figure 6:
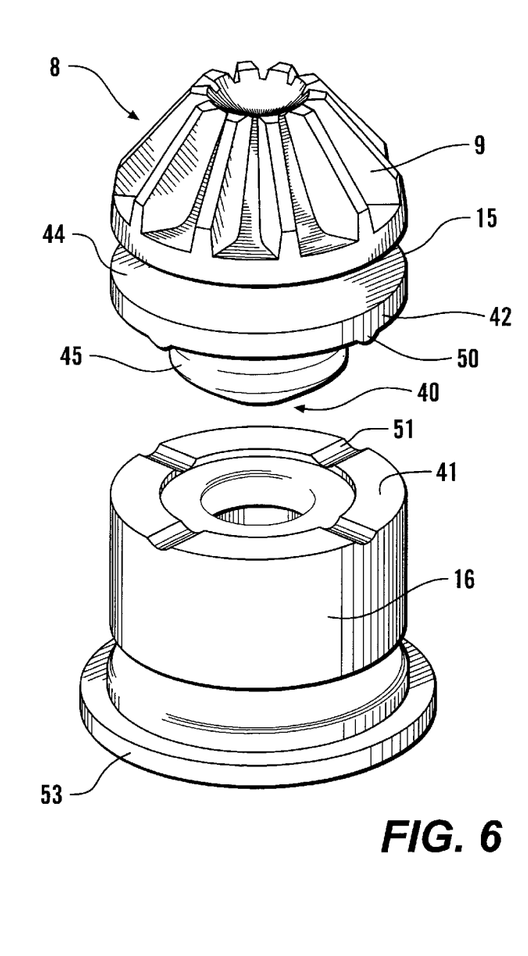
FIG. 6 is an exploded view of the slipping clutch shown in FIG. 4.

Referring to FIGS. 4 and 6, the slipping clutch 8 has a first clutch part 15 and a second clutch part 16. The slipping clutch may be manufactured from plastic, and it has been effective to manufacture it as described below. However, materials may be suitable for this purpose and may be used for the device for setting the distance between two components. For example, the clutch may include metallic materials such as a metallic backbone or other features.

Clutch part 15 and clutch part 16 are arranged coaxially along the axis of rotation and have, in the rotational sense, a substantially symmetrical design. They are arranged axially relative to one another, and are not displaceable in the axial direction. Clutch part 15 has, at the end facing away from clutch part 16, the bevel wheel 9 which is preferably formed in one piece with clutch part 15.

Clutch parts 15 and 16, are fixed in terms of rotation on their mutually confronting end faces 40 of the first clutch part 15, and 41 of the second clutch part 16, up to a maximum torque. The first clutch part 15 has a resilient ring or plate 42 with bosses 50 that are in engagement with complementary indents 51 of the second clutch part 16, up to a maximum torque. The bosses 50 and 51 are completely complementary in shape. Between resilient ring 42 and bevel wheel 9 is located a groove 44. Clutch part 15 and clutch part 16 have identical diameters on the end faces 40,41.

Figure 5:
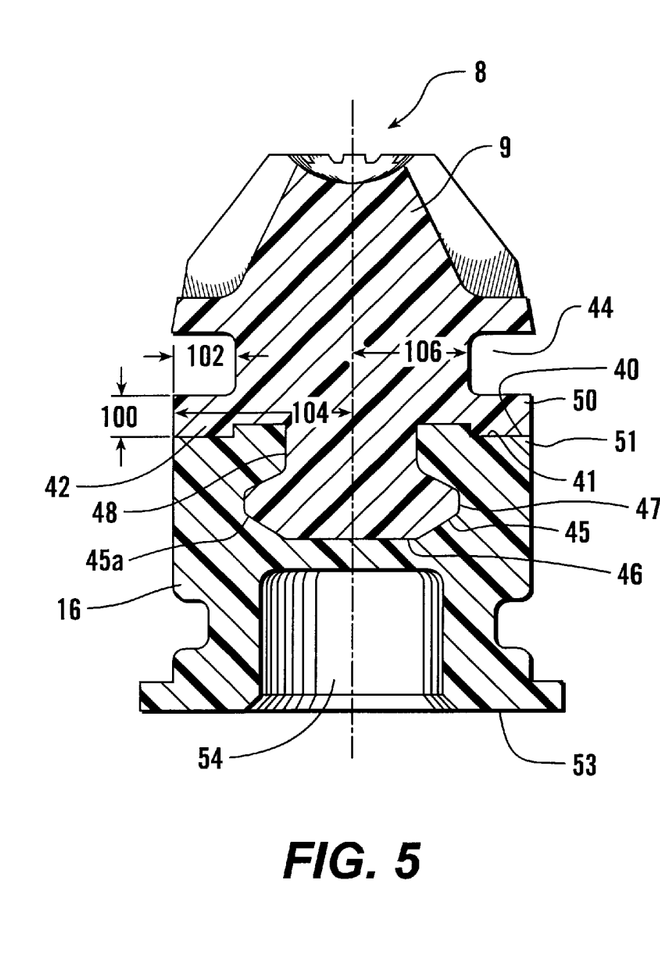
FIG. 5 is a sectional view of the slipping clutch shown in FIG. 4.

FIG. 5 illustrates a cross-section of slipping clutch 8 shown in FIG. 4. Clutch part 15 has an engagement member 45 extending from end face 40 for engaging the clutch part 16. Clutch part 16 has, on the end face 41 facing clutch part 15, engagement cavity 46 complementary to first engagement member 45. Engagement member 45 and engagement cavity 46 are connected in such a way that no axial movement of the clutch parts 15, 16 occurs. Preferably, engagement member 45 of clutch part 15 is formed in one piece with clutch part 15. In the present embodiment, engagement member 45 is a connecting head 45a with a smaller diameter neck 48. This connecting head 45a is arranged coaxially to clutch part 15 and has an essentially circular cross section when viewed from the top. The connecting head 45a has, at its end, bulges 47 that are larger in diameter than neck 48. The engagement member 45a completely fills cavity 46.

When clutch part 15 is engaged with clutch part 16, the end faces 40, 41 of clutch parts 15, 16 bear against one another. The engagement member 45 and engagement cavity 46 connect the first clutch part 15 and the second clutch part 16 axially to one another so that axial movement of the clutch parts 15, 16 relative to one another is not possible.

As seen in FIG. 5, the resilient plate 42 has a width 100. The resilient plate 42 has, on the side facing clutch part 16, bosses 50 or the like which extend axially away from the resilient ring or plate 42 in the direction of clutch part 16. Clutch part 16 has complementary indents 51 on the end face 41 facing clutch part 15. The bosses 50 are projections which, up to a maximum torque, engage the corresponding indents 51.

Figure 8:
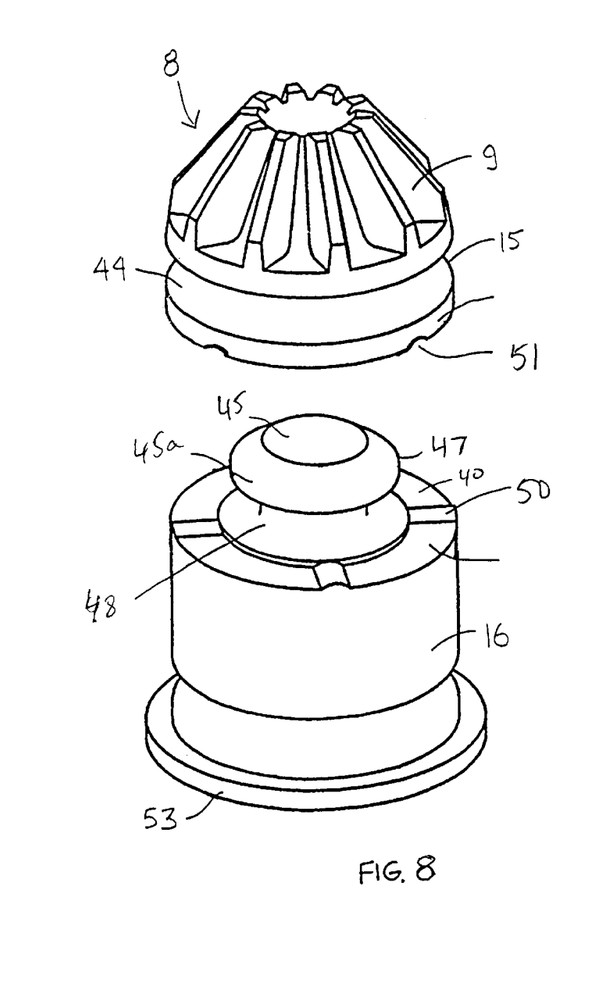
FIG. 8 is an exploded view of one alternative embodiment of the slipping clutch.
Figure 9:
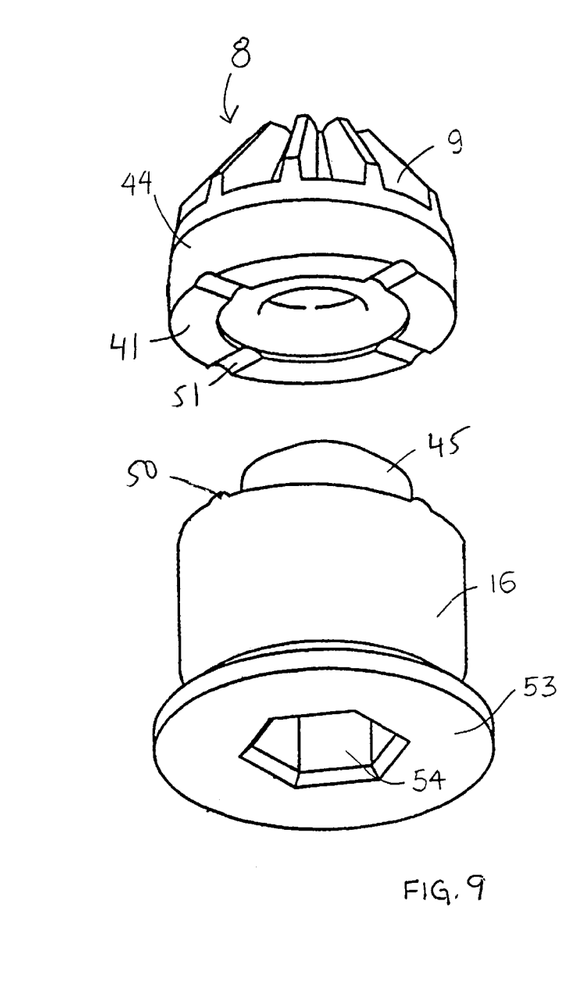
FIG. 9 is an additional exploded view of the slipping clutch shown in FIG. 8.

However, referring to FIGS. 8 and 9, it will be understood that the bosses 50 and the indents 51 on the clutch parts are exchangeable. This means that bosses 50 may be provided on the second clutch part, and vice versa. The same applies to the resilient ring; this may also be provided for on the second clutch part.

Figure 7:
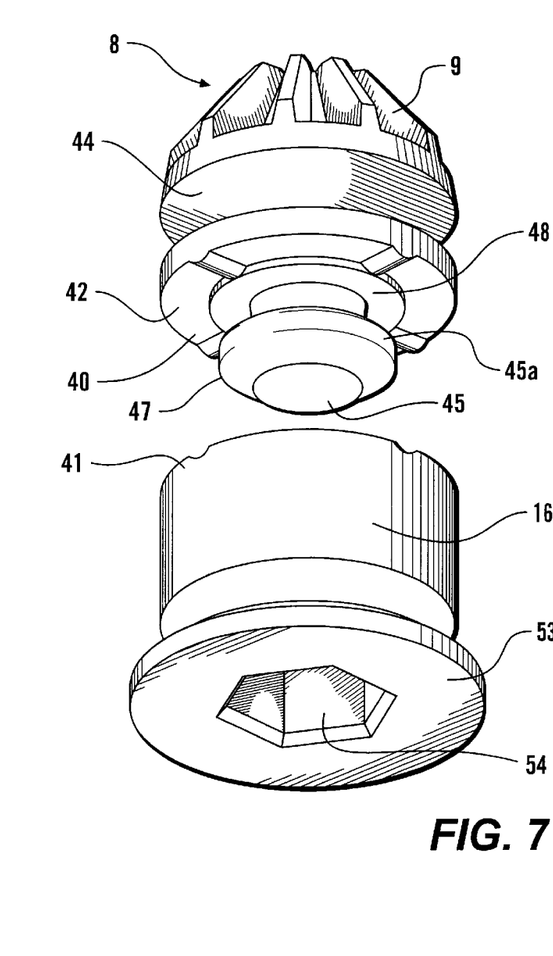
FIG. 7 is an additional exploded view of the slipping clutch shown in FIG. 4.

Referring to FIGS. 5 and 7, clutch part 16 has, on the end face 53 facing away from the first clutch part, a recess 54 for receiving a drive means which is not illustrated here. This recess 54 may be a hexagonal socket, a cross slot, or the like.

Referring to FIG. 4, the clutch part 16 rotates because the first and second clutch parts are in engagement with one another fixedly in terms of rotation by the bosses 50 and indents 51, so that the torque is transmitted to clutch part 15. However, this takes place only up to a maximum torque. When the effective torque exceeds this maximum torque, the resilient ring or plate 42 springs away from clutch part 16 in the direction of the arrow 60, with the result that the bosses 50 and indents 51 lose their engagement, and clutch parts 15, 16 rotate relative to one another so that torque transmission is no longer possible. Specifically, bosses 50 become unseated from indents 51. Eventually, bosses 50 will rotate until they are once again seated in an indent 51. However, if the torque is still greater than the maximum torque, the bosses 50 will again become inseated. This will happen repeatedly until the torque does not exceed maximum torque.

Maximum torque is capable of being set by means of the dimensions of the plate 42, and the choice of plastic for the plate 42. As shown in FIG. 5, dimensions which may be mentioned here are the width 100 of the resilient plate 42 and the depth 102 of the groove 44, which is equivalent to the radius 104 of the resilient plate 42 minus radius 106 under bevel wheel 9. The greater the depth 102 of the groove 44 and the smaller the width 100 of the resilient plate 42, the lower the maximum transmittable torque, the material being the same. The maximum torque depends, furthermore, on the design and arrangement of the bosses 50 and indents 51.

End faces 41 and 42 of clutch parts 15 and 16 are of completely complementary design. This means that there are no closed cavities between the surfaces of these end faces. It is thereby possible to manufacture the slipping clutch in such a way that, during production, at least one clutch part may serve partially as a mold for the other clutch part.

Within the scope of the present invention, a method for producing a plastic slipping clutch, with a first and a second clutch part, in particular for a device for setting the distance between a first and a second component, in particular for the horizontal and vertical setting of motor vehicle headlamps, is also provided, which has the following steps: (a) forming the first clutch part from a first plastic in a first mold, and (b) forming the second clutch part from a second plastic in a second mold, the first clutch part possibly being at least part of the second mold. Conversely, of course, the second clutch part may possibly be at least part of the first mold.

The method according to the invention makes it possible to produce a slipping clutch quickly and advantageously. In this case, the production of the two elements, specifically the first and second clutch parts, may be carried out in two work steps merging smoothly one into the other. It is necessary merely to remove the injection mold from the element formed first in each case, so that this element can then be used after the shortest possible time as the injection mold for the second element (or at least as part of the injection mold) for injection-coating or injection-filling.

Furthermore, using one element as the injection mold for the other element ensures that the connection of the two elements thus formed is virtually free of play. Although the cooling of the plastic after injection into the corresponding injection mold is accompanied by some shrinkage of the plastic, this shrinkage can be kept low for the use of selected plastics that the resulting play between the two corresponding elements connected to one another is minimal.

In the production of a slipping clutch 8, the plastic used to form the first element (also the partial injection mold) has a volume loss after forming and cooling of the molded plastic of less than 1%, and particularly preferably of less than 0.5%. In addition, the second plastic preferably has a volume loss after forming of less than 1%, and particularly preferably, of less than 0.5%.

It has been found effective to use a plastic with a suitable glass-fiber fraction and one with a glass-fiber fraction of 30% has been found particularly effective. Such plastics may include: polyamide 66 (PA 66), polyacetal (POM), polypropylene (PP), polybutyleneterephthalate (PBT) or polyamide 6 (PA 6). In one embodiment, the plastics used for producing the first and the second clutch elements of the slipping clutch are modified by means of a slip additive. The slip additive may consist of graphite, molybdenum sulphide $MoS^2$, Teflon (PTFE) or silicone, or may contain one of these materials. As is apparent from the function of plate 42, the plastic used to make plate 42 will not undergo plastic deformation as a result of repeated slipping.

For forming the second of the two elements by using the first element as a partial injection mold, the plastic of the second element should have a melting point lower than or equal to the melting point of the plastic used for forming the first-formed element. This difference in melting points prevents the first-formed element from being melted down when the second element is being formed. This melting-down process may also be prevented in another way. For example, the first-formed element could have a vaporizable coating applied thereto. In this case, a plastic used for the second-formed element can have a melting point somewhat higher than the melting point of the plastic for the first-formed element.

If different plastics are used for the two elements, specifically the first clutch part and the second clutch part, the plastics are preferably selected in such a way that the amount of difference between the coefficients of thermal expansion of the two plastics in a temperature range between −50° C. and 100° C., is less than 10%. Different temperature ranges would be suitable for other applications. This ensures that, over the entire relevant temperature range, minimal play in the axial connection between the two elements is ensured. It has been found advantageous if the same plastic is used in forming the first and second clutch parts.

In order to speed up the described method for producing the slipping clutch, it is possible to shorten the cooling time (necessary for ensuring dimensional stability) for the first-formed element of the slipping clutch with the provision of a cooling mechanism, for example in the corresponding injection mold. In general, a cooling time of at most 7 seconds can be achieved.

In operation, the device for setting the distance between a first and a second component functions as follows. First, a torque is applied to slipping clutch 8 in drive section 7 by a driving mechanism, not illustrated, (i.e. a screwdriver or the like). For these purposes, clutch part 16 preferably has on the end face facing away from clutch part 15, a corresponding recess for receiving the drive means. Torque is transmitted from clutch part 16 to clutch part 15.

The first clutch part 15 and the second clutch part 16 are connected to one another fixedly in terms of rotation up to a maximum torque. It is therefore possible for torque to be transmitted up to this maximum torque. When the applied torque exceeds the maximum torque, the bosses 50 and indents 51 come loose from their engagement so that the second clutch part 16 can rotate relative to the first. Further torque transmission is thus prevented.

When the applied torque is below the maximum torque, it is transmitted from the second clutch part 16 to the first clutch part 15, and then from the bevel wheel 9 of the first clutch part 15 to the crown wheel 10 of the setting screw 1. The setting screw 1 rotates, with the result that the guide part 4 is moved linearly in the directions of the double arrow 6, depending on the direction of rotation. At the same time, the distance between the crown wheel 10 and the basic body 17 of the guide part 4, and therefore between the first and the second components, decreases or increases depending on the direction of rotation.

In this case, the guide part 4 can reach a first position of maximum distance between the basic body 17 and the crown wheel 10, or between the first and second components, in which position the collar 14 of the fixed stop 13 touches the inside of the guide part 4 at surface 60. The guide part 4 consequently cannot be moved further in the same axial direction. As a result, the torque in the slipping clutch 8 rises and exceeds the maximum torque, and the second clutch part 16 slips relative to the first. Further torque transmission is then no longer possible.

At the opposite end position, a minimum distance between the basic body 17 and the crown wheel 10 or between the first and second components is reached when the second end 12 of the setting screw 1 touches the inner surface of body 17, for example the spring 25. Spring 25 yields somewhat in the axial direction. However, a maximum torque is reached on slipping clutch 8, Clutch parts 15 and 16 once again uncouple when more torque is applied to move and 12 toward spring 25. Further torque transmission is then, once again, no longer possible.

The slipping clutch 8, therefore, avoids the situation where the device is damaged due to the drive 7 being driven further after the minimum or maximum end position of the guide part 4 is reached. When a maximum torque is exceeded, the two clutch parts 15 and 16 are simply uncoupled, so that further torque transmission is no longer possible.

Figure 2:
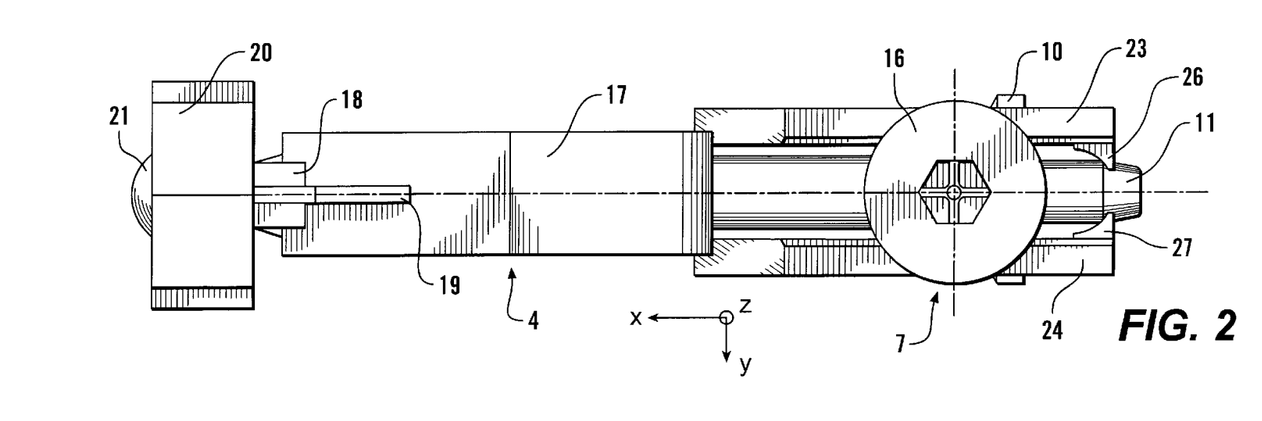
FIG. 2 is a bottom elevational view of the device shown in FIG. 1.

FIG. 2 shows stops 26 and 27 on the arms 23 and 24 for limiting a movement of the guide part 4 in a first component (not shown) in that the said stops bear against slipping clutch 8 or more specifically, the bevel wheel 9.

The device according to the invention for setting the distance between a first and a second component, in particular for the horizontal and vertical setting of motor vehicle headlamps, has many advantages, as compared with the prior art. First, by using a slipping clutch in the drive section or on the setting screw, torques only up to a maximum torque are transmitted. Consequently, when an end position is reached in which parts of the device move up against one another and therefore the effective torque rises abruptly, it is no longer possible for parts of the device to be damaged. Beyond a maximum torque, further torque transmission is no longer possible. Moreover, the slipping clutch allows the use of fixed stops for both end positions of the device for distance setting. Due to the use of a fixed stop, the thread of the setting screw can no longer come loose from the counterthread of the guide part. Particularly in the device for the horizontal and vertical setting of motor vehicle headlamps, the headlamp can then no longer fall out of the housing.

The plastic slipping clutch described, which may be used for the device for distance setting, is simple to manufacture and meets stringent requirements as to the accuracy of fit of the clutch parts. It should be recognized that the clutching feature of the present invention may be readily adapted to a wide variety of headlamp adjusters, including, without limitation, adjusters such as those disclosed in U.S. Pat. Nos. 5,707,133; 5,214,971; and 6,050,712 to Burton and 6,036,341 to Dobler.

While the present invention has been described and illustrated herein with regard to specific embodiments, which embodiments are believed to be the most practical and preferred embodiments, it should be understood that various design modifications could be made to these embodiments without departing from the scope of the present invention. It should be recognized that modifications may be made by one of skill in the art of the invention without departing from the spirit or intent of the invention and therefore, the invention is to be taken as including all reasonable equivalents to the subject matter of the appended claims.

What is claimed is:

1. A slipping clutch comprising:
   a first clutch part adapted for engagement with a crown wheel;
   a second clutch part connected to the first clutch part such that the second clutch part can rotate with respect to the first clutch part after a maximum torque has been applied to the second clutch part.

2. A slipping clutch comprising:
   a first clutch part adapted for engagement with a crown wheel;
   a second clutch part connected to the first clutch part such that the second clutch part can rotate with respect to the first clutch part after a maximum torque has been applied to the second clutch part; and
   wherein the first clutch part is substantially cylindrical with a bevel wheel at one end and a head at an opposite end, the head disposed in a cavity in the second clutch part to connect the first clutch part to the second clutch part.

3. The slipping clutch of claim 1 wherein the first clutch part further includes a plate and a head that is disposed in a cavity in the second clutch part to couple the first clutch part to the second clutch part.

4. The slipping clutch of claim 3 wherein the plate is formed from plastic.

5. A slipping clutch comprising:
   a first clutch part adapted for engagement with a crown wheel, the first clutch part including a plate portion having at least one boss protruding therefrom; and
   a second clutch part connected to the plate portion of the first clutch part such that the second clutch part can rotate with respect to the first clutch part after a maximum torque has been applied to the second clutch part.

6. The slipping clutch of claim 5 wherein the second clutch part further includes at least one complementary indent corresponding to the at least one boss protruding from the plate.

7. A slipping clutch comprising:
   a first clutch part adapted for engagement with a crown wheel, the first clutch part including a plate portion having at least one indent in a surface thereof; and
   a second clutch part connected to the plate portion of the first clutch part such that the second clutch part can rotate with respect to the first clutch part after a maximum torque has been applied to the second clutch part.

8. The slipping clutch of claim 7 wherein the first clutch part further includes at least one complementary boss corresponding to the at least one indent in the plate.

9. The slipping clutch of claim 1 wherein the first clutch part is substantially cylindrical and includes a bevel wheel at one end and a cavity therein at an opposite end.

10. The slipping clutch of claim 1 wherein the first clutch part further includes a bevel wheel at one end and a cavity at an opposite end, and wherein the second clutch part has a head extending therefrom that connects the second clutch part to the cavity of the first clutch part.

11. The slipping clutch of claim 1 wherein the first clutch part and the second clutch part are formed from plastic.

12. The slipping clutch of claim 11 further including a plate coupled between the first clutch part and the second clutch part that is made from a plastic that is different from that of the first clutch part.

13. A device for setting the distance between a first component and a second component, the device comprising:
  a setting screw which is adapted for connection to the first component;
  a guide part connected to the setting screw and adapted for connection to the second component; and
  a slipping clutch engaging the setting screw in a manner that causes the guide part to move axially with respect to the setting screw until a maximum torque is applied to the slipping clutch.

14. The device according to claim 13, wherein the slipping clutch is comprised of plastic.

15. The device according to claim 13 wherein the slipping clutch further includes:
  a first clutch part adapted for engagement with a crown wheel; and
  a second clutch part connected to the first clutch part so that the second clutch part can rotate with respect to the first clutch part after a maximum torque has been applied to the slipping clutch.

16. A device for setting the distance between a first component and a second component, the device comprising:
  a setting screw which is adapted for connection to the first component;
  a guide part connected to the setting screw and adapted for connection to the second component;
  a slipping clutch engaging the setting screw in a manner that causes the guide part to move axially with respect to the setting screw until a maximum torque is applied to the slipping clutch, and wherein the slipping clutch includes a first clutch part adapted for engagement with a crown wheel and a second clutch part connected to the first clutch part so that the second clutch part can rotate with respect to the first clutch part after a maximum torque has been applied to the slipping clutch; and
  wherein the first clutch part is cylindrical with a bevel wheel at one end and a head at an opposite end, the head disposed in a cavity in the second clutch part to connect the first clutch part to the second clutch part.

17. A device for setting the distance between a first component and a second component, the device comprising:
  a setting screw which is adapted for connection to the first component;
  a guide part connected to the setting screw and adapted for connection to the second component;
  a slipping clutch engaging the setting screw in a manner that causes the guide part to move axially with respect to the setting screw until a maximum torque is applied to the slipping clutch, and wherein the slipping clutch includes a first clutch part adapted for engagement with a crown wheel and a second clutch part connected to the first clutch part so that the second clutch part can rotate with respect to the first clutch part after a maximum torque has been applied to the slipping clutch; and
  wherein the first clutch part further includes a plate and a head that is disposed in the cavity in the second clutch part to couple the first clutch part to the second clutch part.

18. The device according to claim 17 wherein the plate is formed from plastic.

19. A device for setting the distance between a first component and a second component, the device comprising:
  a setting screw which is adapted for connection to the first component;
  a guide part connected to the setting screw and adapted for connection to the second component; and
  a slipping clutch engaging the setting screw in a manner that causes the guide part to move axially with respect to the setting screw until a maximum torque is applied to the slipping clutch, the slipping clutch comprising:
    a first clutch part adapted for engagement with a crown wheel, the first clutch part including a plate having at least one boss protruding therefrom on a head thereof; and
    a second clutch part connected to the plate of the first clutch part so that the second clutch part can rotate with respect to the first clutch part after a maximum torque has been applied to the slipping clutch.

20. The device according to claim 19 wherein the second clutch part further includes at least one complementary indent corresponding to the at least one boss protruding from the plate.

21. A device for setting the distance between a first component and a second component, the device comprising:
  a setting screw which is adapted for connection to the first component;
  a guide part connected to the setting screw and adapted for connection to the second component; and
  a slipping clutch engaging the setting screw in a manner that causes the guide part to move axially with respect to the setting screw until a maximum torque is applied to the slipping clutch, the slipping clutch comprising:
    a first clutch part adapted for engagement with a crown wheel, the first clutch part including a plate having at least one indent in a surface thereof; and
    a second clutch part connected to the plate of the first clutch part so that the second clutch part can rotate with respect to the first clutch part after a maximum torque has been applied to the slipping clutch.

22. The device according to claim 21 wherein the first clutch part further includes at least one complementary boss corresponding to the at least one indent in the plate.

23. The device according to claim 15 wherein the first clutch part is substantially cylindrical and includes a bevel wheel at one end and a cavity therein at an opposite end.

24. The device according to claim 15 wherein the first clutch part further includes a bevel wheel at one end thereof and a cavity in another end thereof and wherein the second clutch part has a head extending therefrom that connects the second clutch part to the first clutch part.

25. The device according to claim 15 wherein the first clutch part and the second clutch part are formed from plastic.

26. The device according to claim 25 further including a plate coupled between the first clutch part and the second clutch part that is made from a plastic that is different from that of the first clutch part.

27. The device according to claim 15 wherein the setting screw has a fixed stop for determining a maximum distance between the first and the second component.

28. A method for producing a plastic slipping clutch comprising the following steps:

forming a first clutch part from a first plastic in a first mold; and forming a second clutch part from a second plastic in a second mold wherein the first clutch part comprises at least part of the second mold.

29. The method according to claim 28 wherein the second plastic has a volume loss after forming of less than about 1%.

30. The method according to claim 28 wherein the first plastic and the second plastic have coefficients of thermal expansion one of which has a higher value and which, in a temperature range of about −50° C. to about +100° C., differ by less than about 10% of the higher value.

31. The method of claim 30 wherein the first clutch part is formed to have a head and wherein the head comprises at least part of the second mold.

32. A headlamp adjuster comprising:

a drive member having a first clutch part adapted for engagement with a crown wheel; and a second clutch part connected to the first clutch part such that the second clutch part is rotatable with respect to the first clutch part when a maximum torque is applied to the second clutch part, the second clutch part including a drive means receiving recess therein.

* * * * *